(12) United States Patent
Martell et al.

(10) Patent No.: US 10,135,611 B1
(45) Date of Patent: *Nov. 20, 2018

(54) DELIVERING A CONTENT ITEM FROM A SERVER TO A DEVICE

(71) Applicant: CSC Holdings, LLC, Bethpage, NY (US)

(72) Inventors: Lawrence Robert Martell, Huntington, NY (US); Brett Henriksen, Greenlawn, NY (US); Michael Lariccio, Bellport, NY (US); Brian Sweeney, Oyster Bay, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,163

(22) Filed: Feb. 14, 2017

Related U.S. Application Data (63) Continuation of application No. 13/434,428, filed on Mar. 29, 2012, now Pat. No. 9,577,824.

(60) Provisional application No. 61/538,515, filed on Sep. 23, 2011.

(51) Int. Cl.
*H04L 29/06* (2006.01)
*H04L 9/08* (2006.01)
*H04L 9/14* (2006.01)
*H04L 21/00* (2006.01)

(52) U.S. Cl.
CPC ............ *H04L 9/083* (2013.01); *H04L 9/14* (2013.01); *H04L 2209/60* (2013.01)

(58) Field of Classification Search
CPC ............ H04L 63/0435; H04L 63/0457; H04L 63/062; H04L 63/08; H04L 63/0823; H04L 63/10; H04L 65/4069; H04L 65/4076; H04L 65/602; H04L 67/02; H04L 67/42; H04L 2209/60; H04L 9/083; H04L 9/14

USPC ......... 713/168, 189; 380/210; 709/203, 219, 709/224; 725/25

See application file for complete search history.

(56) References Cited

U.S. PATENT DOCUMENTS

| | | | | |
|---|---|---|---|---|
| 8,225,083 B2 * | 7/2012 | Ganesan | ................. | G06F 12/00 713/150 |
| 8,275,123 B2 * | 9/2012 | Bichler | ................. | H04L 9/0872 380/259 |
| 8,649,515 B1 | 2/2014 | Zhao et al. | | |
| 8,769,614 B1 * | 7/2014 | Knox | .................... | H04L 63/08 726/3 |
| 9,038,116 B1 * | 5/2015 | Knox | ................... | H04L 12/2805 709/219 |
| 9,577,824 B2 | 2/2017 | Martell et al. | | |
| 2002/0106190 A1 * | 8/2002 | Nygren | .................. | H04N 21/21 386/353 |

(Continued)

*Primary Examiner* — Gary S Gracia
(74) *Attorney, Agent, or Firm* — Sterne, Kessler, Goldstein & Fox PLLC (57) ABSTRACT

Methods and systems for delivering a segmented content item from a server to a first and second device are provided. A first key is used to encrypt the segmented content item into a first plurality of encrypted segments and a second key is used to encrypt the segmented content item into a second plurality of encrypted segments. The first and second keys are different. The first plurality of encrypted segments is delivered to the first device, and the second plurality of encrypted segments is delivered to the second device.

21 Claims, 8 Drawing Sheets

(56) References Cited

U.S. PATENT DOCUMENTS

| | | | | |
|---|---|---|---|---|
| 2002/0174208 A1* | 11/2002 | Morlitz | H04L 29/06 | 709/223 |
| 2003/0009669 A1* | 1/2003 | White | H04N 1/32272 | 713/176 |
| 2003/0172270 A1* | 9/2003 | Newcombe | G06Q 20/3674 | 713/168 |
| 2004/0024688 A1* | 2/2004 | Bi | G06F 21/10 | 705/37 |
| 2004/0117500 A1* | 6/2004 | Lindholm | G06F 21/10 | 709/231 |
| 2004/0133914 A1* | 7/2004 | Smith | H04N 7/17318 | 725/86 |
| 2004/0187014 A1* | 9/2004 | Molaro | G06F 21/10 | 726/27 |
| 2005/0108413 A1* | 5/2005 | Melmon | G11B 20/00086 | 709/231 |
| 2006/0063594 A1* | 3/2006 | Benbrahim | G07F 17/32 | 463/42 |
| 2007/0206799 A1* | 9/2007 | Wingert | G06F 21/10 | 380/285 |
| 2007/0230704 A1* | 10/2007 | Youn | H04L 63/06 | 380/277 |
| 2007/0245409 A1* | 10/2007 | Harris | H04L 63/0272 | 726/5 |
| 2007/0294186 A1 | 12/2007 | Yan | | |
| 2008/0120656 A1* | 5/2008 | Jupin | G06Q 30/02 | 725/70 |
| 2008/0162358 A1* | 7/2008 | Patsiokas | G06F 21/10 | 705/57 |
| 2008/0219445 A1* | 9/2008 | Yato | H04L 63/0428 | 380/255 |
| 2008/0301317 A1* | 12/2008 | Lee | H04L 29/06027 | 709/231 |
| 2009/0089355 A1* | 4/2009 | Kudo | G06K 15/02 | 709/201 |
| 2009/0144205 A1* | 6/2009 | Hurry | G06Q 20/085 | 705/75 |
| 2009/0144273 A1* | 6/2009 | Kappos | G06F 17/30743 | |
| 2009/0183000 A1* | 7/2009 | Krig | H04L 63/0442 | 713/168 |
| 2009/0222392 A1* | 9/2009 | Martin | G11B 27/105 | 706/46 |
| 2009/0235343 A1* | 9/2009 | Sheehan | G06F 9/54 | 726/7 |
| 2009/0276462 A1* | 11/2009 | Inokuchi | G11B 20/00086 | |
| 2009/0276626 A1 | 11/2009 | Lazaridis et al. | | |
| 2009/0315670 A1* | 12/2009 | Naressi | G06F 21/10 | 340/5.8 |
| 2010/0008509 A1* | 1/2010 | Matsushita | H04L 9/083 | 380/279 |
| 2010/0017599 A1* | 1/2010 | Sellars | G06Q 20/02 | 713/156 |
| 2010/0054477 A1* | 3/2010 | Chew | G06F 21/6209 | 380/277 |
| 2010/0138900 A1* | 6/2010 | Peterka | H04L 12/2812 | 726/4 |
| 2010/0185730 A1* | 7/2010 | Sebastian | H04L 12/1859 | 709/204 |
| 2010/0189265 A1 | 7/2010 | Ito et al. | | |
| 2010/0228975 A1* | 9/2010 | Lipka | H04L 63/061 | 713/168 |
| 2010/0274664 A1* | 10/2010 | Fernandez Gutierrez | G06Q 30/02 | 705/14.45 |
| 2010/0287367 A1 | 11/2010 | Liu et al. | | |
| 2010/0310075 A1 | 12/2010 | Lin et al. | | |
| 2010/0323682 A1* | 12/2010 | Hatayama | H04H 20/08 | 455/422.1 |
| 2011/0058675 A1* | 3/2011 | Brueck | H04N 21/2541 | 380/277 |
| 2011/0087706 A1* | 4/2011 | Gole | G06F 17/30575 | 707/802 |
| 2011/0154382 A1 | 6/2011 | Chow et al. | | |
| 2011/0161403 A1* | 6/2011 | Fu | H04L 67/2842 | 709/203 |
| 2011/0231660 A1* | 9/2011 | Kanungo | H04L 63/0435 | 713/168 |
| 2011/0231663 A1* | 9/2011 | Li | G06F 21/64 | 713/176 |
| 2011/0271306 A1* | 11/2011 | Kahn | H04N 7/162 | 725/68 |
| 2011/0289317 A1* | 11/2011 | Darapu | H04N 21/25816 | 713/168 |
| 2011/0314378 A1* | 12/2011 | Nijim | G06F 17/3089 | 715/716 |
| 2011/0317839 A1* | 12/2011 | Yoneda | H04L 9/085 | 380/270 |
| 2012/0124613 A1* | 5/2012 | Reddy | H04N 21/42202 | 725/27 |
| 2012/0174150 A1* | 7/2012 | Reddy | H04N 21/25841 | 725/31 |
| 2012/0216271 A1* | 8/2012 | Cooper | H04L 63/0254 | 726/12 |
| 2013/0080777 A1 | 3/2013 | Martell et al. | | |

* cited by examiner

A computer-based method of delivering a segmented content item from a server to a first and second device.

Use a first key to encrypt the segmented content item into a first plurality of encrypted segments. — 710

Use a second key to encrypt the segmented content item into a second plurality of encrypted segments, wherein the first and second keys are different. — 720

Deliver the first plurality of encrypted segments to the first device. — 730

Deliver the second plurality of encrypted segments to the second device. — 740

End — 750

DELIVERING A CONTENT ITEM FROM A SERVER TO A DEVICE

CROSS REFERENCE TO RELATED APPLICATIONS

This patent application is a continuation of U.S. Nonprovisional patent application Ser. No. 13/434,428, filed Mar. 29, 2012, now U.S. Pat. No. 9,577,824 issued on Feb. 21, 2017, which claims the benefit of U.S. Provisional Patent Application No. 61/538,515 filed on Sep. 23, 2011, entitled "Delivering a Content Item from a Server to a Device," which is incorporated by reference herein in its entirety.

BACKGROUND OF THE INVENTION

Field of the Invention

The present invention is generally related to the authorized delivery of content items, and specifically related to the delivery of encrypted content items to multiple devices.

Related Art

As consumer demand increases for the delivery of content items to devices, the need for secure approaches to delivery has also increased. Modern smart phones, tablet computers, laptop computers and portable media devices are all capable of the display of different content items.

Often those seeking to circumvent the protection of rights associated with a content item will collaborate and exchange information. Given modern Internet communications, limiting the success of this collaboration continues to be a challenge for content item providers.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art(s) to make and use the invention.

The features and advantages of embodiments will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Figure 1:
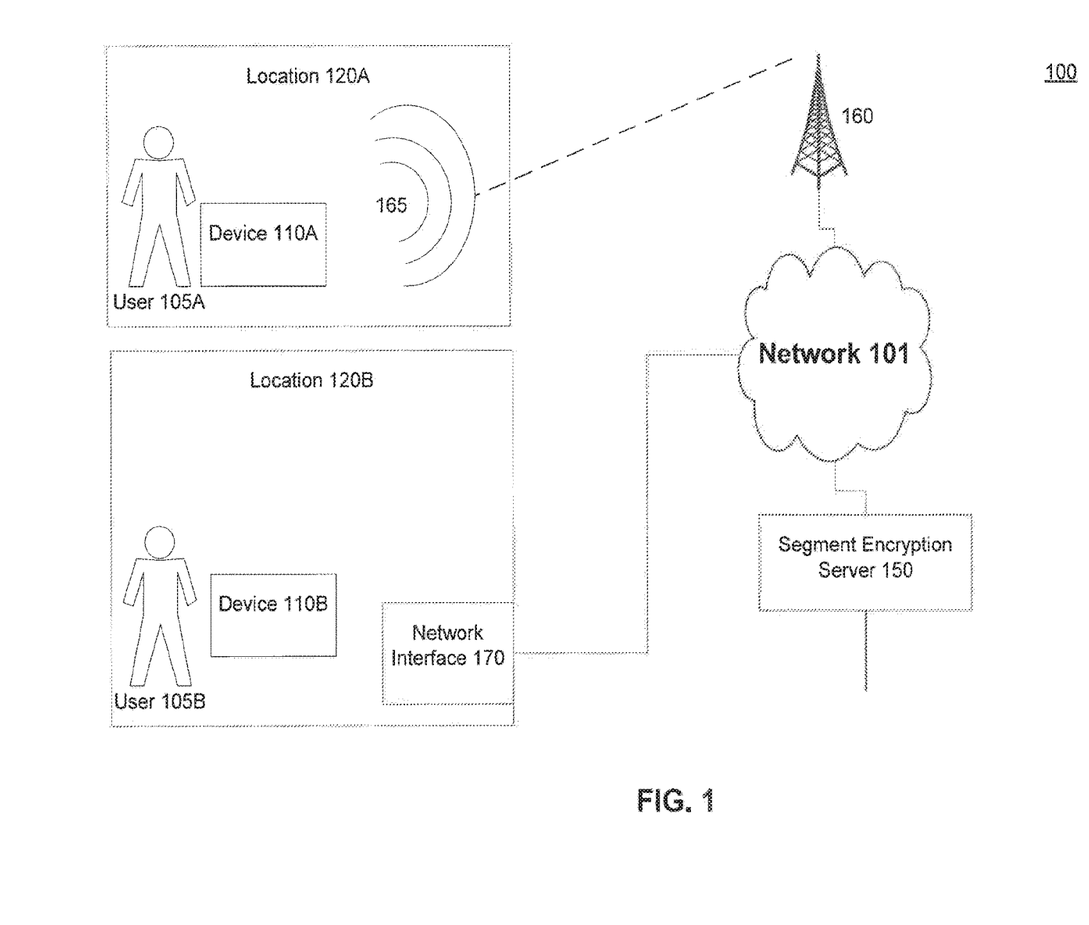
FIG. 1 is a high level block diagram of a system of delivering a segmented content item to multiple devices, in accordance with embodiments of the present invention.

FIG. 1 shows an example network application architecture 100 in which embodiments of the present invention, or portions thereof, may be implemented. Architecture 100 includes locations 120A-B, wireless base station 160, network 101 and segment encryption server 150. Locations 120A-B include devices 110A-B respectively. Location 120A further includes wireless signal 165, such signal wirelessly coupling device 110A to network 101 via wireless base station 160. Location 120B further includes network interface 170 that couples device 110B to network 101. Segment encryption server 150 is coupled to network 101. As used herein, the term "network interface" may refer to a network interface device, such as a cable modem, a router, or a wireless base station, or to a network interface component within a device, such as an Ethernet network interface card (NIC), or a Wi-Fi interface. As used herein, the term "location" refers to a localized area, for example: a household, a portion of a building, a building, a city block or other similar local areas.

According to an exemplary embodiment, users 105A-B are subscribers to services provided by segment encryption server 150. Example services include the delivery of content items to authorized devices. Typically, as used herein, a "user" generally refers to a human individual, but user could collectively refer to a group of people, e.g., a family, or an organization. The "user" concepts described herein can also be applied to the devices 110A-B themselves as "users" of provided services.

Generally speaking, an embodiment delivers a segmented content item from segment encryption server 150 to device 110A and device 110B. As discussed further with respect to FIGS. 2-3, a first key is used by segment encryption server 150 to encrypt the segmented content item into a first plurality of encrypted segments and a second key is used by segment encryption server 150 to encrypt the segmented content item into a second plurality of encrypted segments.

The encrypted first and second pluralities of encrypted segments are delivered respectively to devices 110A and 110B. At devices 110A-B, the respective encrypted pluralities of encrypted segments are decrypted using decryption keys. The respective decryption keys correspond to the first and second keys used for encryption.

Content items include any type of media content, for example audio and video content. In different embodiments, media content can be streamed or delivered completely to devices 110A-B. As would be appreciated by one having skill in the relevant art(s), given the description herein, any content item requiring protection of rights and delivery to a device, could benefit from embodiments described herein.

Figure 2:
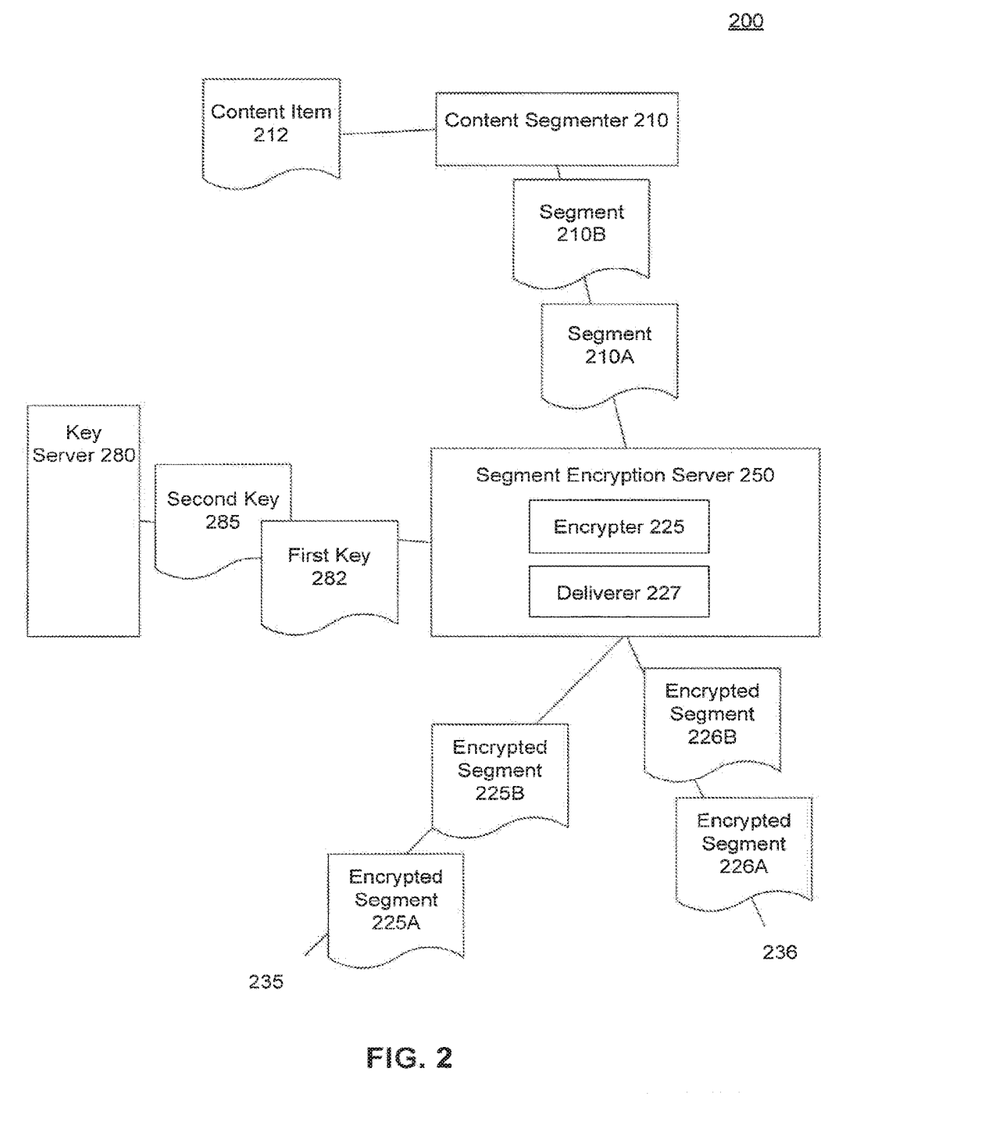
FIG. 2 is a more detailed block diagram of a segment encryption server, in accordance with embodiments of the present invention.

FIG. 2 shows a network application architecture 200 having a detailed view of a key server and a server having an encrypter. Architecture 200 includes segment encryption server 250, content segmenter 210 and key server 280. Content segmenter 210 is coupled to segment encryption server 250. Content segmenter 210 receives content item 212 and generates segments 210A-B. Segments 210A-B are transferred from content segmenter 210 to segment encryption server 250. In an embodiment, segment encryption server 250 is a content delivery network (CDN) server.

Segment encryption server 250 is also coupled to destinations 235 and 236, and to key server 280. First key 282 and second key 285 are keys transferred from key server 280 to segment encryption server 250. As discussed further with respect to FIGS. 4-5 below, destinations 235 and 236 are devices configured to receive and decrypt respective encrypted segments 225A-B and 226A-B. Devices 110A-B from FIG. 1 are example destinations where content item segments can be received, decrypted and viewed. Segment encryption server 250 includes encrypter 225 and deliverer 227.

In a traditional system, segments 210A-B would be encrypted with a rotating set of common keys, prior to delivery to a CDN server. From the CDN server, segments 210A-B would traditionally be delivered to different destination devices, where common keys used for encryption would respectively be used to enable use of the content. In an embodiment described herein, segments 210A-B are delivered to segment encryption server 250 unencrypted. As described below, encrypter 225 and key server 280 can encrypt segments 210A-B using different keys for each destination.

In an example, first key 282 is used by encrypter 225 to generate encrypted segment 226A from segment 210A, and second key 285 is used by encrypter 225 to generate encrypted segment 225A from the same segment 210A. Similarly, first key 282 is used by encrypter 225 to generate encrypted segment 226B from segment 210B, and second key 285 is used by encrypter 225 to generate encrypted segment 225B from segment 210B. Typically, as performed by embodiments described herein, first key 282 is different from second key 285, such that possession of one decryption key will not allow content item segments encrypted by the other key to be viewed.

As content item segments are encrypted by encrypter 225 into encrypted segments 225A-B and 226A-B, they can be delivered by deliverer 227 to respective destinations 235 and 236. In another approach, as discussed with respect to FIG. 5 below, encrypted segments 225A-B and 226A-B can be stored and sent to destinations at a later time.

Figure 3:
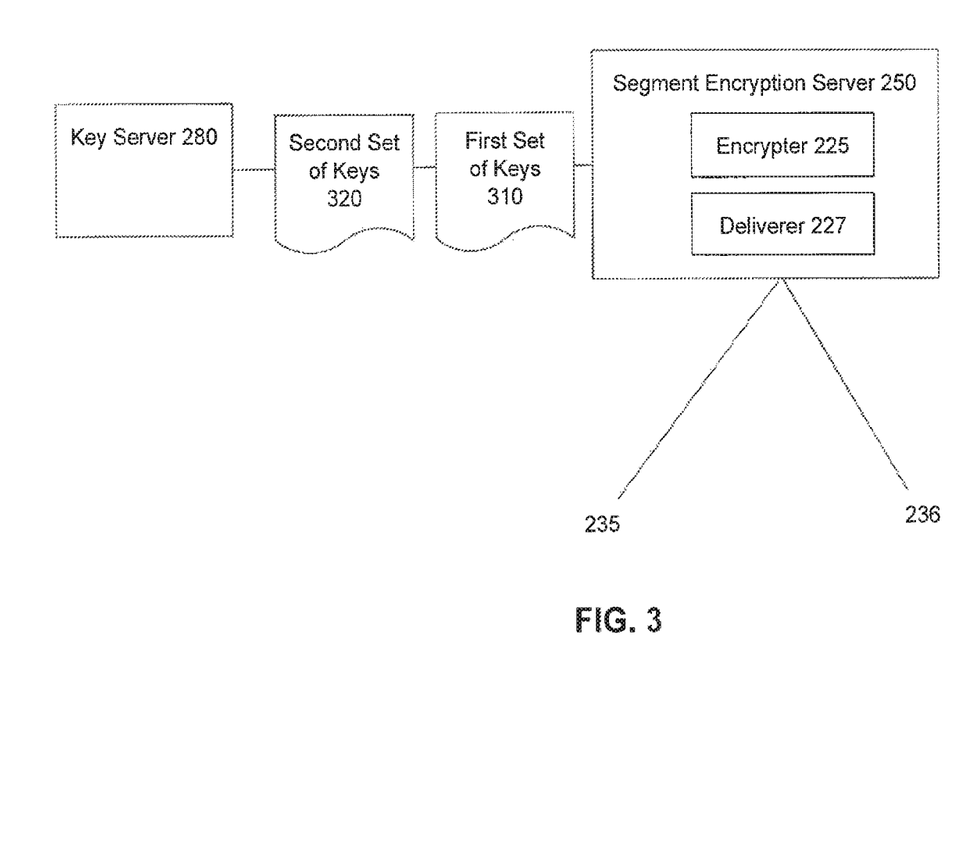
FIG. 3 is another block diagram of a segment encryption server, in accordance with embodiments of the present invention.

FIG. 3 shows a view of segment encryption server 250 and key server 280. Segment encryption server 250 includes encrypter 225 and deliverer 227. Segment encryption server 250 is coupled to key server 280 and destinations 235 and 236. In contrast to FIG. 2, where first key 282 and second key 285 are shown, FIG. 3 shows a first set of keys 310 and a second set of keys 320. As used typically herein, a "set of keys" is at least two encryption keys from which a key can be chosen to encrypt content item segments.

Successive keys in a set of keys are used to encrypt successive content item segments. In one approach, in a single set of keys, and between two sets of keys, individual keys can be reused. In another approach, keys are unique within a single set of keys and/or unique across all sets of keys used to encrypt a content item.

For example, segment 210A from FIG. 2 can be encrypted using a first key from first set of keys 310 and segment 210B can be encrypted using a second key from first set of keys 310. This first set of content item segments encrypted using first set of keys 310 can be delivered to destination 235. Similarly, segment 210A from FIG. 2 can also be encrypted using a first key from second set of keys 320 and segment 210B can be encrypted using a second key from second set of keys 320. This second set of content item segments encrypted using second set of keys 320 can be delivered to destination 236.

Figure 4:
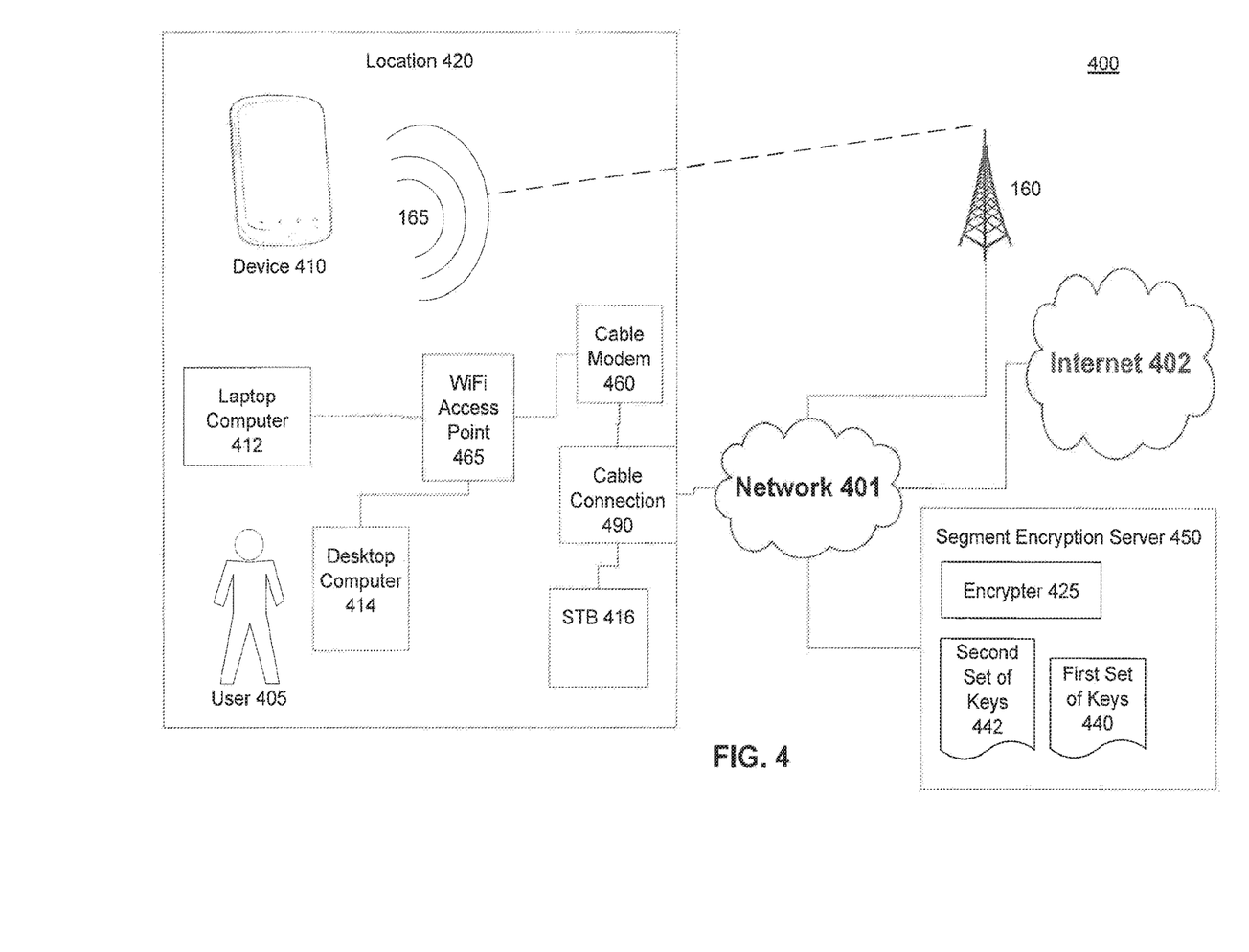
FIG. 4 is s detailed block diagram of a system of delivering a segmented content item to multiple devices using a segment encryption server, in accordance with embodiments of the present invention.

FIG. 4 shows a more detailed view of network application architecture 400. Network application architecture 400 includes location 420, wireless base station 160, network 401, Internet 402 and segment encryption server 450. Segment encryption server 450 has encrypter 425, first set of keys 440 and second set of keys 442. Location 420 is a geographic location that includes user 405, device 410, wireless signal 165, laptop computer 412, desktop computer 414, Wi-Fi access point 465, cable connection 490, set-top box (STB) 416 and cable modem 460.

Wi-Fi access point 465 is wirelessly coupled to laptop computer 412 (shown by a dotted line) and is coupled using a wired connection to desktop computer 414. Though Wi-Fi access point 465 uses a wireless coupling to connect to devices, concepts discussed herein that are applicable to this component can apply to other similar types of network interface devices, e.g., routers and switches. Cable modem 460 is coupled to Wi-Fi access point 465 and cable connection 490. Cable connection 490 is coupled using a wired connection to STB 416 and segment encryption server 450 via network 401. Location 420 further includes wireless signal 165. Wireless signal 165 couples device 410 to network 401 via wireless base station 160.

In an embodiment, network 401 is a proprietary network managed by the service provider that operates segment encryption server 450, such network coupled both to segment encryption server 450 and Internet 402. In alternate embodiment, segment encryption server 450 is coupled to network 401 via Internet 402. User 405 is a subscriber to services provided by segment encryption server 450.

Similar to the examples discussed with the description of FIGS. 2 and 3 above, first set of keys 440 and second set of keys 442 are transferred to segment encryption server 450 by a key server 280. Encrypter 425 is then used with first set of keys 440 and second set of keys 442 to encrypt content for associated devices. The described functions of a key server can also be performed by components within segment encryption server 450.

First set of keys 440 and second set of keys 442 are each associated with a device to which encrypted content item segments are delivered. For example, first set of keys 440 is associated with device 410 and second set of keys 442 is associated with desktop computer 414. The associations between sets of keys and devices can be one to one, e.g., first set of keys 440 is only associated with device 410. Sets of keys can also be associated with more than one device. For example, second set of keys 442 is associated with both laptop computer 412 and desktop computer 414.

One benefit that can be achieved by having different sets of keys associated with known devices is an increase in difficulty for those seeking to circumvent the protection of rights associated with a content item. Because a set of keys is associated with a particular device, if these keys are copied and used on a different device the content item cannot be viewed.

One approach to associating sets of keys to specific devices uses a session to link the sets of keys to the devices. For example, when device 410 connects to segment encryption server 450, a session can be established and first set of keys 440 can be associated with the device. Details of session use by embodiments are discussed further with the description of FIG. 6 below.

Another approach to associating sets of keys to respective devices uses an identifier associated with the device. The following illustrative list of identifiers R1-R4 that can be used alone or in any combination, as an association linkage between a device and a set of keys used to encrypt segmented content items. Items R1-R4 are listed below:

R1. User Identifier: The user identifier can be a user name and/or password needed to access a user subscriber account. For example, in making a request for a content item, a user identifier can be sent by device 410 to segment encryption server 450. Other user identifiers include identifiers stored on a device. Examples of stored identifiers include: a user certificate, a device certificate, a token stored in device memory and a web cookie stored in a browser. In addition, a user identifier may be determined, indirectly, via associations with other identifiers such as R2-R4, below.

R2. Device Identifier (also termed herein as a "hardware identifier"): Modern electronic devices can include a variety of indentifying information that can be used to associate a set of keys with a device. One hardware identifier that can be used by an embodiment is a MAC address assigned to a network interface within destination device 410. The hardware identifier can be sent by device 410 with the request to view the content item. The device identifier can also be retrieved by the segment encryption server from device 410. A device identifier can be also be obtained while a connection is being established. For example, wireless base station 160 may obtain the MAC address of device 410 when establishing wireless connection using wireless signal 165.

R3. Network Interface Information: The network interface to which a requesting device is coupled can provide a link to associate a set of keys with the device. Network interfaces such as Wi-Fi access point 465, cable modem 460, cable connection 490 and wireless base station 160 can have identifiers that are linked to a location 420, devices and/or a requesting user. Linking a device with a set of encryption keys can be based upon information associated with: network interface 170 from FIG. 1, cable connection 490, cable modem 460 and Wi-Fi access point 465 from FIG. 4. In an example, device 410 is linked to first set of keys 440 by the MAC address of device 410. Laptop computer 412 is linked to second set of keys 442 by a MAC address associated with cable modem 460.

R4. Network Connection Information. In another approach, a requesting device connects via a network that uses identification information to facilitate the connection. For example, devices connecting over Internet 402 have an IP address that can be associated with a device and/or a location. For example, when laptop computer 412 connects to segment encryption server 450 via different components, at each point in the connection path, an IP address is utilized. This IP address can be used to associate a set of keys with a device.

In another example, laptop computer 412 and desktop computer 414 are network connected devices are on a private home network, and their IP addresses are not visible to segment encryption server 450. Both devices are connected to Wi-Fi access point 465 however, and, because it is coupled to a service provider managed element (cable modem 460), the IP address of Wi-Fi access point 465 is visible to elements outside of the in-home private network. Using this approach, the IP address associated with Wi-Fi access point 465 can be used to associate laptop computer 412 and desktop computer 414 to a set of encryption keys.

As would be appreciated by one having skill in the relevant art(s), given the description herein, additional approaches can be used to associate devices with sets of encryption keys.

Figure 5:
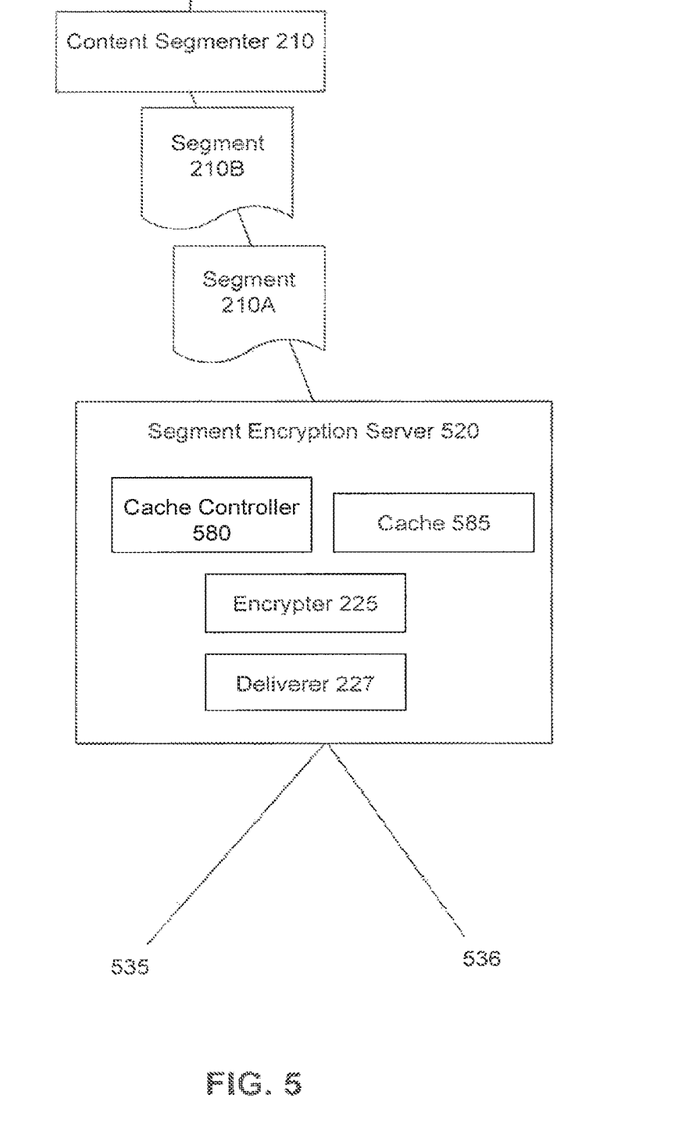
FIG. 5 is a detailed block diagram of a segment encryption server having a cache and cache controller, in accordance with embodiments of the present invention.

FIG. 5 shows another detailed view of segment encryption server 520 and content segmenter 210. Segment encryption server 520 includes cache controller 580, cache 585, encrypter 225 and deliverer 227. Content segmenter 210 is coupled to segment encryption server 220 and segments 210A-B are shown being transferred from content segmenter 210 to segment encryption server 520. Destinations 535 and 536 are coupled to segment encryption server 520.

Cache 585 in segment encryption server 520 can be used to temporarily store segments either before or after encryption by encrypter 225. For example, after segments 210A-B are received by segment encryption server 520 they can be stored in cache 585 before being encrypted by encrypter 225. In a variation of this approach, segments 210A-B encrypted by encrypter 225 after being stored in cache 585.

Figure 6:
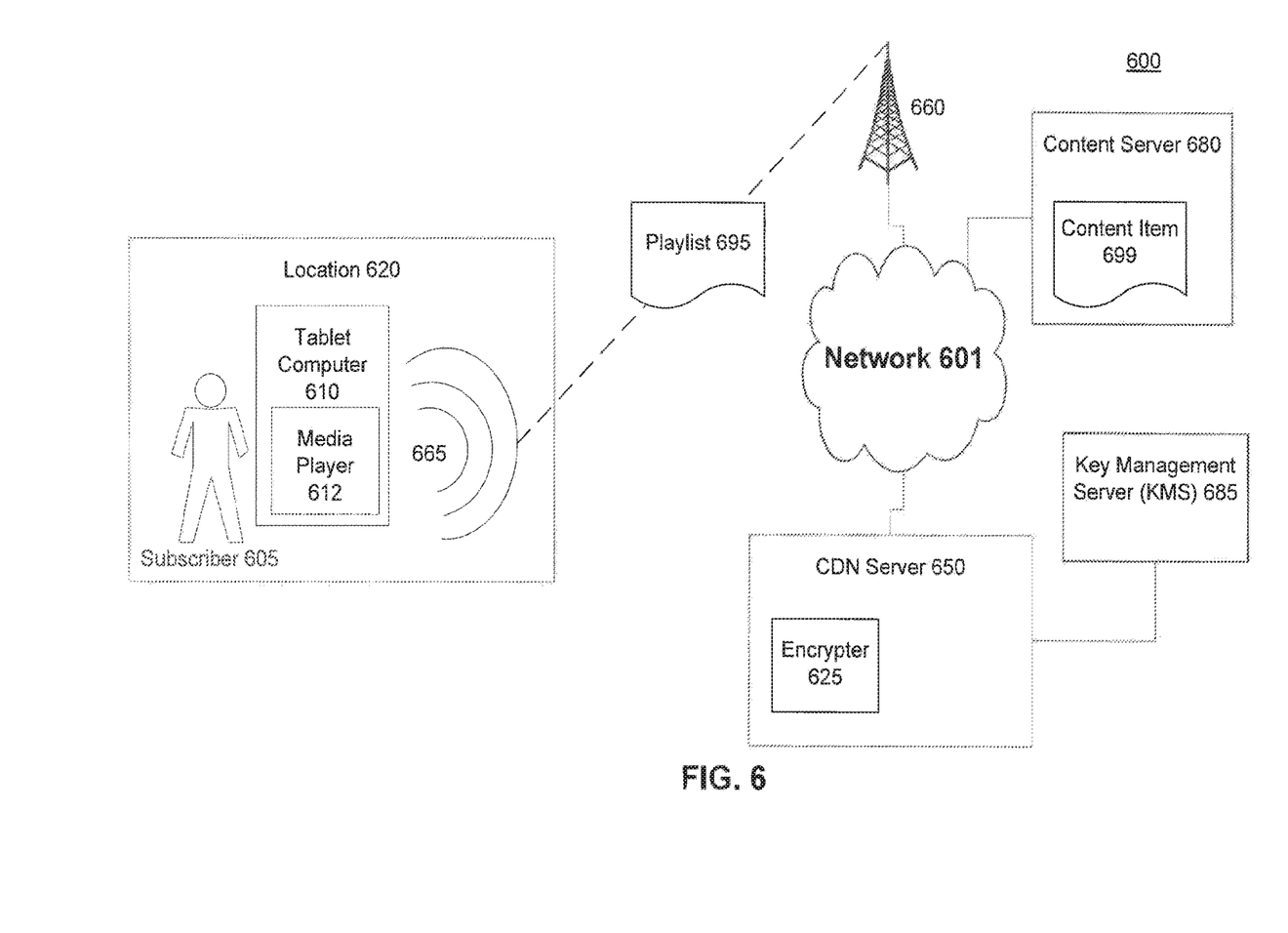
FIG. 6 is a block diagram of a content delivery network (CDN) server, key management server (KMS) and a content server, in accordance with embodiments of the present invention.

FIG. 6 shows an example network application architecture 600 in which embodiments of the present invention, or portions thereof, may be implemented. Architecture 600 includes location 620, wireless base station 660, network 601, key management server (KMS) 685, content server 680 and content delivery network (CDN) server 650. CDN Server 650 has encrypter 625 and is coupled to network 601 and KMS 685. Content server 680 has content item 699 and is coupled to network 601. Location 620 includes subscriber 605, tablet computer 610 and wireless signal 665. Wireless signal 665 wirelessly couples tablet computer 610 to network 601 via wireless base station 660. Tablet computer 610 is a user device having media player 612.

In an example described in this section, subscriber 605 is a subscriber to services provided by CDN server 650. User 605 uses tablet computer 610 to connect to server 650 to request the viewing of content item 699. To service the request of subscriber 605, the following stages S1-S6 below describe example stages performed by an embodiment. Activities S1-S6 are listed below:

S1. Authentication and Entitlement Validation: When a subscriber uses a device to request viewing of a content item, the entitlement of the user and the device to use the device to view the content item are validated. The entitlement of the user and device can be validated by authenticating the user and/or device and checking the user and/or device against records at a CDN server. For example, when subscriber 605 uses tablet computer 610 to request content item 669, subscriber 605 can be authenticated using a username and a password, and the MAC address of tablet 610 can be collected. If records at CDN server 650 show that authenticated subscriber 605 and tablet computer 610 are authorized to view content item 699 then the process proceeds to stage S2.

S2. Session Establishment: Once entitlement to view content item 699 has been validated, CDN server 650 generates a session ID. The generated session ID is specific to the requested content item 699 and tablet computer 610. To generate the session ID, CDN server 650 requests a new session key from a key management server (KMS) 685. KMS 685 creates a session key for encryption of content item 699. At CDN server 650, a database entry is stored for the session, associating the generated session ID with the generated session key, content item 699 and the IP address of tablet computer 610. In other embodiments, other combinations of device and session identifying information can be used.

S3. Using a Session Playlist: Once a session between tablet computer 610 and CDN server 650 is established, the generated session ID and playlist 695 are sent to tablet computer 610. Playlist 695 is generated to be a session-specific playlist file that contains file segment URLs. Each file segment URL refers to a file segment of content item 699.

S4. File Request and Encryption: Once tablet computer 610 receives playlist 695 for content item 699, the session ID and playlist 695 are passed to media player 612. Media player 612 generates a request for a session-specific file segment from playlist 695. This request includes the session ID stored with stage S2 above and the current IP address of tablet computer 610. If the IP address of the request matches the IP address from the initial session request, KMS 685 provides a session key to CDN server 650. Upon receiving the session key, CDN server 650 uses encrypter 625 to encrypt the requested file segment, and delivers the encrypted file to tablet computer 610. In one embodiment, the encryption used is compatible with hardware encryption already used traditional CDN servers to support HTTPS connections, such as 128-bit AES.

S5. Using a File Segment URL and File Transfer: In some traditional content segment delivery systems, a single set of file segment URLs is used to provide access to multiple devices. For example, traditionally, a first authorized device and a second authorized device use the same URLs to access the segments of a segmented content item. In an embodiment, each segment URL is session specific. One approach to creating this session specific URL combines the filename of the segment and the session ID of the requesting device. For example, the session ID might be appended directly to the filename, e.g., "filennn-sessionID"). Alternatively, the session ID can also be appended to a commonly used URL, as a GET parameter, e.g., "filennn?id=sessionID". In response to the validated request based on playlist 695, CDN 650 returns the session ID and the session-specific playlist file to the user device.

S6. Key Request and Decryption: Media player 612 uses the session ID to request the session key used to encrypt the requested segment from CDN server 650. CDN server 650 receives this request, verifies entitlement and returns the session key. The session key is used by the media player to decrypt the delivered session specific playlist file. The above steps are repeated for each segment in playlist 695, with each delivered segment being encrypted/decrypted using a different session key. In other embodiments, a single session key can be used. Different numbers of segments can also be used, with as few as a single segment delivering content item 699.

As would be appreciated by one having skill in the relevant art(s), given the description herein, stages S1-S6 above are example stages intended to illustrate one approach to implementing an embodiment. Stages can be performed in a different order, and additional and/or fewer stages can be used.

Method 700

Figure 7:
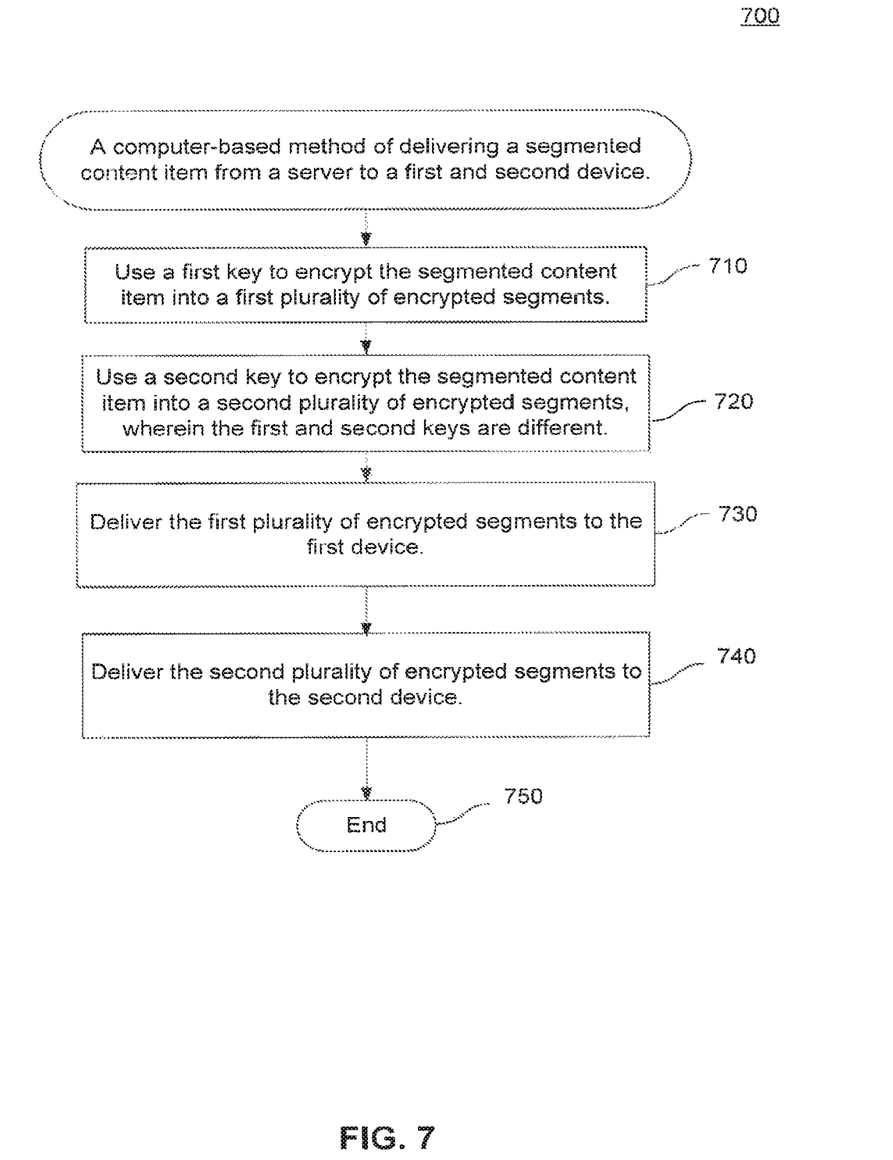
FIG. 7 is a flow diagram illustrating a computer-based method of delivering a segmented content item from a server to a first and second device, in accordance with embodiments of the present invention.

This section and FIG. 7 summarize the techniques described herein by presenting a flowchart of a method 700 of delivering a segmented content item from a server to a first and second device.

Initially, as shown in stage 710 in FIG. 7, a first key is used to encrypt the segmented content item into a first plurality of encrypted segments. For example, first key 282 from FIG. 2 is used by encrypter 225 to encrypt segments 210A-B, into encrypted segments 225A-B. After the completion of stage 710, execution proceeds to stage 720.

At stage 720, a second key is used to encrypt the segmented content item into a second plurality of encrypted segments, the first and second keys being different. For example, second key 285 is used by encrypter 225 to encrypt segments 210A-B, into encrypted segments 225A-B. After the completion of stage 720, execution proceeds to stage 730.

At stage 730, the first plurality of encrypted segments is delivered to the first device. For example, encrypted segments 225A-B are delivered to device 110A. After the completion of stage 730, execution proceeds to stage 740.

At stage 740, the second plurality of encrypted segments is delivered to the second device. For example, encrypted segments 226A-B are delivered to device 110B. After stage 740, method 700 ends at stage 750.

Example Computer System Implementation

Figure 8:
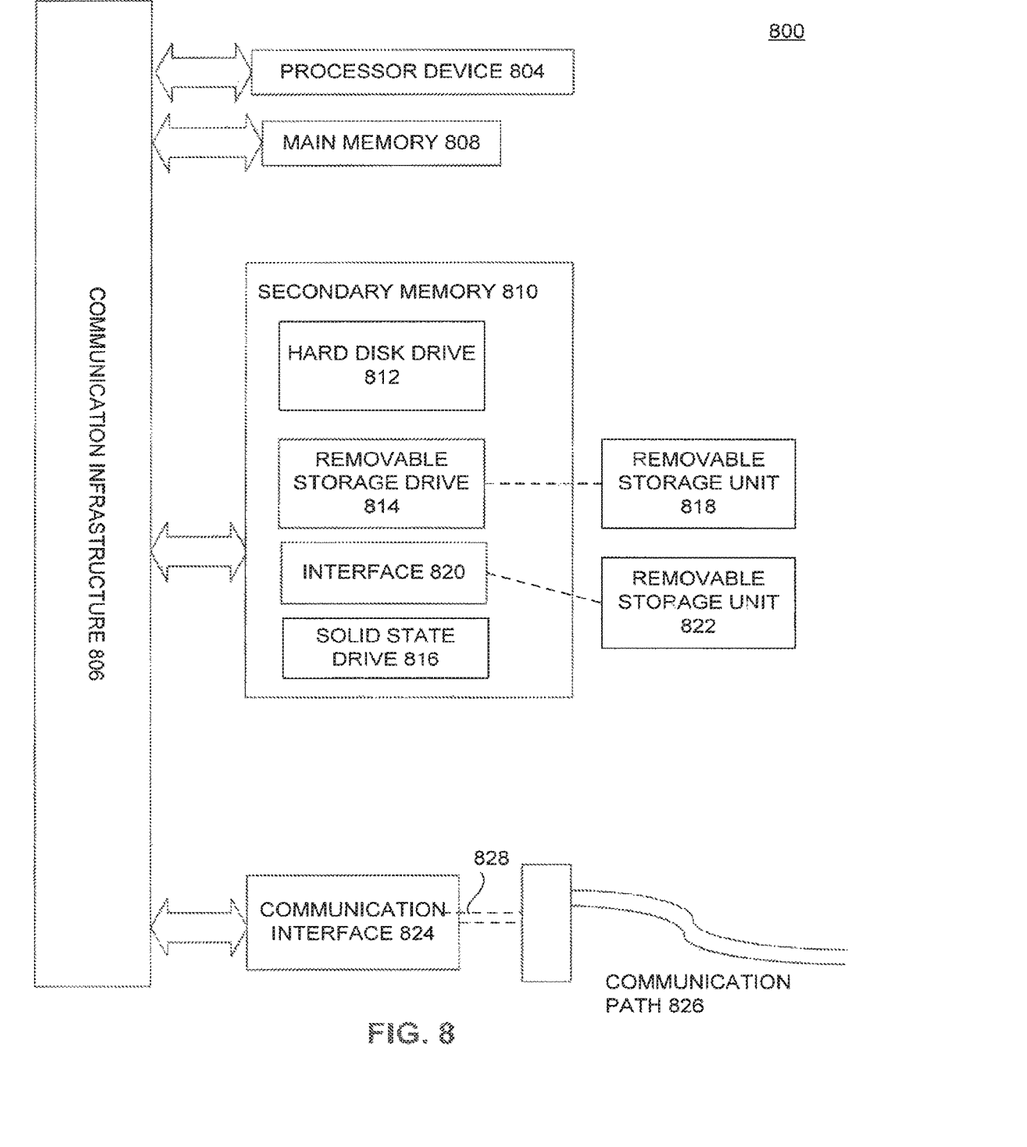
FIG. 8 is a diagram illustrating an exemplary computer system that may be used to implement an embodiment.

FIG. 8 illustrates an example computer system 800 in which embodiments of the present invention, or portions thereof, may be implemented. For example, portions of systems or methods illustrated in FIGS. 1-6 may be implemented using computer system 800 using hardware, software, firmware, tangible computer readable media having instructions stored thereon, or a combination thereof and may be implemented in one or more computer systems or other processing systems. Hardware, software or any combination of such may embody any of the modules/components in FIGS. 1-6 and any stage in FIG. 7. Devices 110A-B, segment encryption servers 150, 250, 450 and 520, content server 680, CDN server 650, KMS 685, tablet computer 610, network interface 170, content segmenter 210, key server 280, laptop computer 412, desktop computer 414, STB 416, Wi-Fi access point 465, and cable modem 460 are examples of components described herein that can also be implemented having components of computer system 800. After reading this description, it will be apparent to a person skilled in the relevant art how to implement the invention using other computer systems and/or computer architectures.

If programmable logic is used, such logic may execute on a commercially available processing platform or a special purpose device. One of ordinary skill in the art may appreciate that embodiments of the disclosed subject matter can be practiced with various computer system and computer-implemented device configurations, including smart phones, cell phones, mobile phones, tablet PCs, multi-core multi-processor systems, minicomputers, mainframe computers, computer linked or clustered with distributed functions, as well as pervasive or miniature computers that may be embedded into virtually any device.

The computer system 800 includes one or more processors, such as processor device 804. Processor device 804 is connected to communication infrastructure 806. Computer system 800 also includes a main memory 808, preferably random access memory (RAM), and may also include a secondary memory 810. Secondary memory 810 may include, for example, a hard disk drive 812 and/or a removable storage drive 814, representing a floppy disk drive, a magnetic tape drive, an optical disk drive, etc. Removable storage drive 814 reads from and/or writes to a removable storage unit 818 in a well-known manner. Removable storage unit 818, represents a floppy disk, magnetic tape, optical disk, etc., which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 that allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a PCM-CIA slot and card, a wireless LAN (local area network) interface, etc. Software and data transferred via communications interface 824 are in the form of signals 828 which may be electronic, electromagnetic, optical, or other signals capable of being received by communications interface 824. These signals 828 are provided to communications interface 824 via a communications path (i.e., channel) 826. This channel 826 carries signals 828 and may be implemented using wire or cable, fiber optics, a phone line, a cellular phone link, a wireless link, and other communications channels.

In this document, the term "computer program product" and "computer-readable medium having computer-executable instructions stored thereon" can refer to removable storage units 818, 822, and signals 828. These computer program products are means for providing software to computer system 800. The invention is directed to such computer program products.

Computer programs (also called computer control logic) are stored in main memory 808, and/or secondary memory 810 and/or in computer program products. Computer programs may also be received via communications interface 824. Such computer programs, when executed, enable computer system 800 to perform the features of the present invention as discussed herein. In particular, the computer programs, when executed, enable the processor device 804 to perform the features of the present invention. Accordingly, such computer programs represent controllers of the computer system 800.

In an embodiment where the invention is implemented using software, the software may be stored in a computer readable storage medium and loaded into computer system 800 using removable storage drive 814, hard disk drive 812 or communications interface 824. The control logic (software), when executed by the processor device 804, causes the processor device 804 to perform the functions of the invention as described herein.

In another embodiment, the invention is implemented primarily in hardware using, for example, hardware components such as application specific integrated circuits (ASICs). Implementation of hardware state machine(s) so as to perform the functions described herein will be apparent to persons skilled in the relevant art(s).

In yet another embodiment, the invention is implemented using a combination of both hardware and software.

CONCLUSION

Embodiments described herein relate to methods, systems and computer program products for delivering a segmented content item from a server to a first and second device. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A computer-based method for a server to deliver a content item to a first device and a second device, the computer-based method comprising:
  storing, in a database of the server, an identifier unique to the first device and an identifier unique to the second device;
  receiving, from the first device, a first request for the content item and a first identifier associated with the first device;
  requesting a first set of encryption keys in response to a first verification that the first identifier matches the identifier unique to the first device stored in the database;
  receiving, from a key management server, the first set of encryption keys in response to the request for the first set of encryption keys;
  receiving a plurality of file segments of the content item;
  associating, in the database of the server, the first set of encryption keys with the content item and the identifier unique to the first device;
  generating a first session-specific playlist including a first plurality of session-specific file segment URLs corresponding to the plurality of file segments, wherein a session-specific file segment URL of the first plurality of session-specific file segment URLs includes a filename of a corresponding file segment of the plurality of file segments appended with a session identification corresponding to a first session;
generating a first encrypted segment by encrypting a file segment of the plurality of file segments using a first encryption key of the first set of encryption keys;
receiving, from the second device, a second request for the content item and a second identifier associated with the second device;
requesting a second set of encryption keys different from the first set of encryption keys in response to a second verification that the second identifier matches the identifier unique to the second device stored in the database;
receiving, from the key management server, the second set of encryption keys in response to the request for the second set of encryption keys;
associating, in the database of the server, the second set of encryption keys with the content item and the identifier unique to the second device;
generating a second session-specific playlist including a second plurality of session-specific file segment URLs corresponding to the plurality of file segments, wherein a session-specific file segment URL of the second plurality of session-specific file segment URLs includes a filename of a corresponding file segment of the plurality of file segments appended with a session identification corresponding to a second session;
generating a second encrypted segment by encrypting the file segment of the plurality of file segments using a second encryption key of the second set of encryption keys; and
delivering the first encrypted segment to the first device and the second encrypted segment to the second device.

2. The computer-based method of claim 1, wherein receiving the first identifier comprises receiving a hardware identifier associated with the first device.

3. The computer-based method of claim 2, wherein receiving the hardware identifier comprises receiving a media access control (MAC) address of the first device.

4. The computer-based method of claim 1, wherein receiving the first identifier comprises receiving an authenticated device credential associated with the first device.

5. The computer-based method of claim 4, wherein receiving the authenticated device credential comprises receiving at least one of a token, a web cookie, or a device certificate.

6. The computer-based method of claim 1, wherein receiving the first identifier comprises receiving identification information associated with a network interface coupled to the first device.

7. The computer-based method of claim 6, wherein receiving the identification information comprises receiving an Internet Protocol (IP) address associated with the network interface.

8. The computer-based method of claim 7, wherein receiving the IP address of the network interface comprises receiving an IP address of one of a cable connection, a cable modem, or a Wi-Fi access point.

9. The computer-based method of claim 1, wherein receiving the first identifier comprises receiving an Internet Protocol (IP) address of the first device.

10. The computer-based method of claim 1, wherein generating the first encrypted segment comprises generating using the first encryption key which is unique to the first set of encryption keys and to the second set of encryption keys.

11. A system to deliver a content item to a first device and a second device, the system comprising:
a database configured to store an identifier unique to the first device and an identifier unique to the second device;
an encryption engine coupled to the database and configured to:
receive, from the first device, a first request for the content item and a first identifier associated with the first device;
request a first set of encryption keys in response to a first verification that the first identifier matches the identifier unique to the first device stored in the database;
receive, from a key management server, the first set of encryption keys in response to the request for the first set of encryption keys;
receive a plurality of file segments of the content item;
associate, in the database, the first set of encryption keys with the content item and the identifier unique to the first device;
generate a first session-specific playlist including a first plurality of session-specific file segment URLs corresponding to the plurality of file segments, wherein a session-specific file segment URL of the first plurality of session-specific file segment URLs includes a filename of a corresponding file segment of the plurality of file segments appended with a session identification corresponding to a first session;
generate a first encrypted segment by encrypting a file segment of the plurality of file segments using a first encryption key of the first set of encryption keys;
receive, from the second device, a second request for the content item and a second identifier associated with the second device;
request a second set of encryption keys different from the first set of encryption keys in response to a second verification that the second identifier matches the identifier unique to the second device stored in the database;
receive, from the key management server, the second set of encryption keys in response to the request for the second set of encryption keys;
associate, in the database, the second set of encryption keys with the content item and the identifier unique to the second device;
generate a second session-specific playlist including a second plurality of session-specific file segment URLs corresponding to the plurality of file segments, wherein a session-specific file segment URL of the second plurality of session-specific file segment URLs includes a filename of a corresponding file segment of the plurality of file segments appended with a session identification corresponding to a second session; and
generate a second encrypted segment by encrypting the file segment of the plurality of file segments using a second encryption key of the second set of encryption keys; and
a communication unit configured to:
deliver the first encrypted segment to the first device and the second encrypted segment to the second device.

12. The system of claim 11, wherein the first identifier comprises a hardware identifier associated with the first device.

13. The system of claim 12, wherein the hardware identifier comprises a media access control (MAC) address of the first device.

14. The system of claim 11, wherein the first identifier comprises an authenticated device credential associated with the first device.

15. The system of claim 14, wherein the authenticated device credential comprises at least one of a token, a web cookie, or a device certificate.

16. The system of claim 11, wherein the first identifier comprises identification information associated with a network interface to which the first device is connected.

17. The system of claim 16, wherein the identification information comprises an Internet Protocol (IP) address associated with the network interface.

18. The system of claim 17, wherein the network interface comprises one of a cable connection, a cable modem, or a Wi-Fi access point.

19. The system of claim 11, wherein the first identifier comprises an Internet Protocol (IP) address of the first device.

20. The system of claim 11, wherein the first encryption key is unique to the first set of encryption keys and to the second set of encryption keys.

21. A non-transitory computer-readable medium having computer-executable instructions stored thereon that, when executed by a computing device, cause the computing device to perform a method for a server to deliver a content item to a first device and a second device, the method comprising:

storing, in a database of the server, an identifier unique to the first device and an identifier unique to the second device;

receiving, from the first device, a first request for the content item and a first identifier associated with the first device;

requesting a first set of encryption keys in response to a first verification that the first identifier matches the identifier unique to the first device stored in the database;

receiving, from a key management server, the first set of encryption keys in response to the request for the first set of encryption keys;

receiving a plurality of file segments of the content item;

associating, in the database of the server, the first set of encryption keys with the content item and the identifier unique to the first device;

generating a first session-specific playlist including a first plurality of session-specific file segment URLs corresponding to the plurality of file segments, wherein a session-specific file segment URL of the first plurality of session-specific file segment URLs includes a filename of a corresponding file segment of the plurality of file segments appended with a session identification corresponding to a first session;

generating a first encrypted segment by encrypting a file segment of the plurality of file segments using a first encryption key of the first set of encryption keys;

receiving, from the second device, a second request for the content item and a second identifier associated with the second device;

requesting a second set of encryption keys different from the first set of encryption keys in response to a second verification that the second identifier matches the identifier unique to the second device stored in the database;

receiving, from the key management server, the second set of encryption keys in response to the request for the second set of encryption keys;

associating, in the database of the server, the second set of encryption keys with the content item and the identifier unique to the second device;

generating a second session-specific playlist including a second plurality of session-specific file segment URLs corresponding to the plurality of file segments, wherein a session-specific file segment URL of the second plurality of session-specific file segment URLs includes a filename of a corresponding file segment of the plurality of file segments appended with a session identification corresponding to a second session;

generating a second encrypted segment by encrypting the file segment of the plurality of file segments using a second encryption key of the second set of encryption keys; and delivering the first encrypted segment to the first device and the second encrypted segment to the second device.

* * * * *